United States Patent [19]

Netzel

[11] 4,263,476
[45] Apr. 21, 1981

[54] INSULATION SPACER FOR GAS-INSULATED TRANSMISSION LINE WITH IMPROVED OUTER RIM STRUCTURE

[75] Inventor: Philip C. Netzel, Milmont Park, Pa.

[73] Assignee: Electric Power Research Institute, Palo Alto, Calif.

[21] Appl. No.: 82,130

[22] Filed: Oct. 5, 1979

[51] Int. Cl.³ .......................... H01B 17/58; H01B 9/04
[52] U.S. Cl. ........................................ 174/156; 174/28
[58] Field of Search .............. 174/16 B, 21 C, 21 CA, 174/22 C, 28, 29, 99 R, 99 B, 99 E, 111, 155, 156, 167; 138/112, 113, 114; 333/244

[56] References Cited

U.S. PATENT DOCUMENTS

| 4,095,041 | 6/1978 | Netzel et al. | 174/28 |
| 4,100,367 | 7/1978 | Netzel | 174/28 |
| 4,122,298 | 10/1978 | Brandt | 174/28 |

FOREIGN PATENT DOCUMENTS

| 909588 | 4/1954 | Fed. Rep. of Germany | 174/111 |
| 1218573 | 6/1966 | Fed. Rep. of Germany | 174/28 |
| 1,222,134 | 8/1966 | Fed. Rep. of Germany | 174/28 |
| 1515832 | 11/1969 | Fed. Rep. of Germany | 174/28 |
| 2351615 | 4/1975 | Fed. Rep. of Germany | 174/28 |

Primary Examiner—Laramie E. Askin
Attorney, Agent, or Firm—Ostrolenk, Faber, Gerb & Soffen

[57] ABSTRACT

An insulation spacer for supporting a high voltage conductor within a flexible housing which is filled with electronegative gas has a central insulation hub and a concentric outer rim which are joined by a thin web. A plurality of tapered ribs extend from the outer rim to reinforce the outer rim against high loading forces and extend for approximately two-thirds of the radial thickness of the web and merge with the web. Ribs are placed at the latch and keeper areas of the halves of the insulator which are snapped together to form a single disk.

8 Claims, 12 Drawing Figures

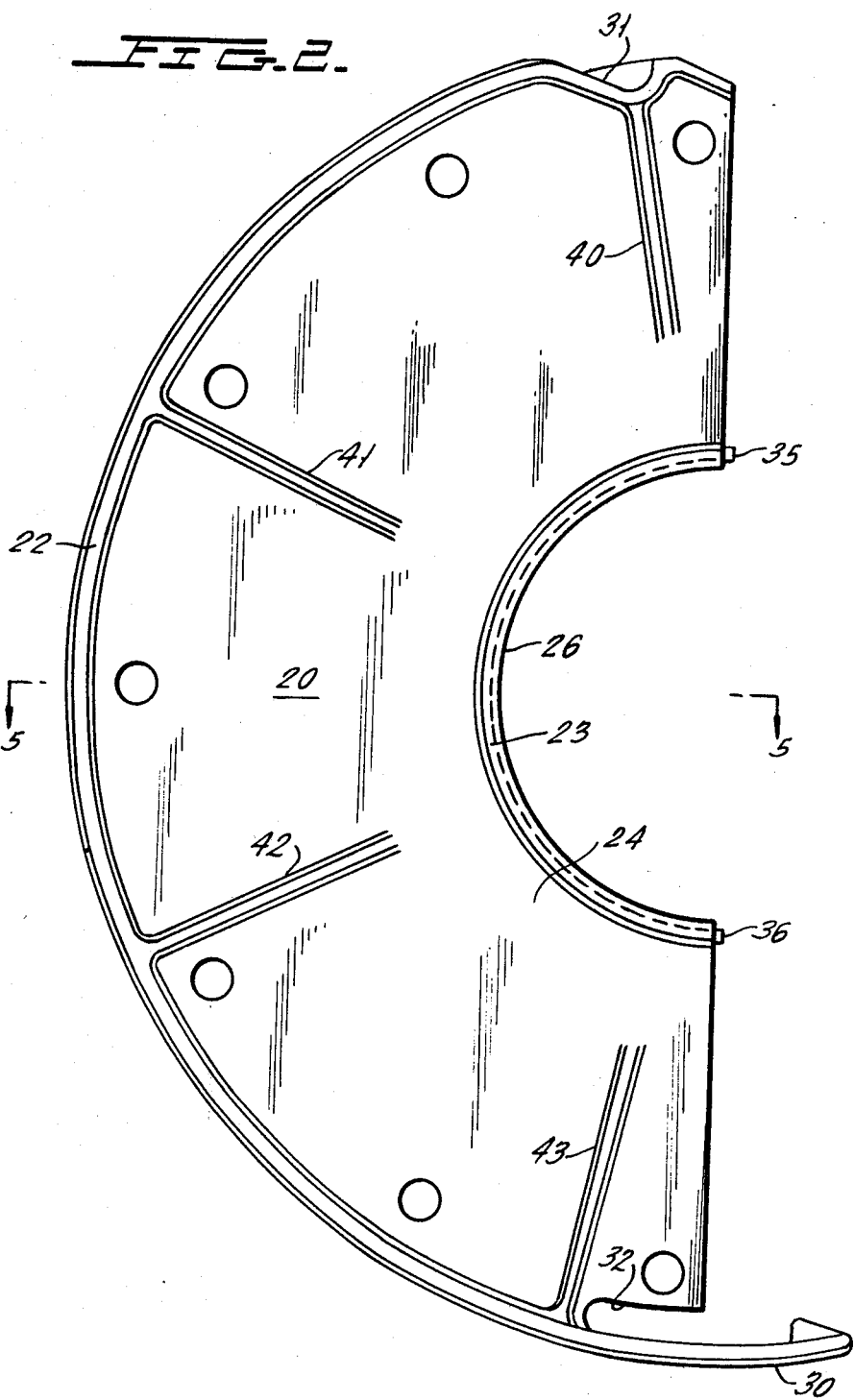

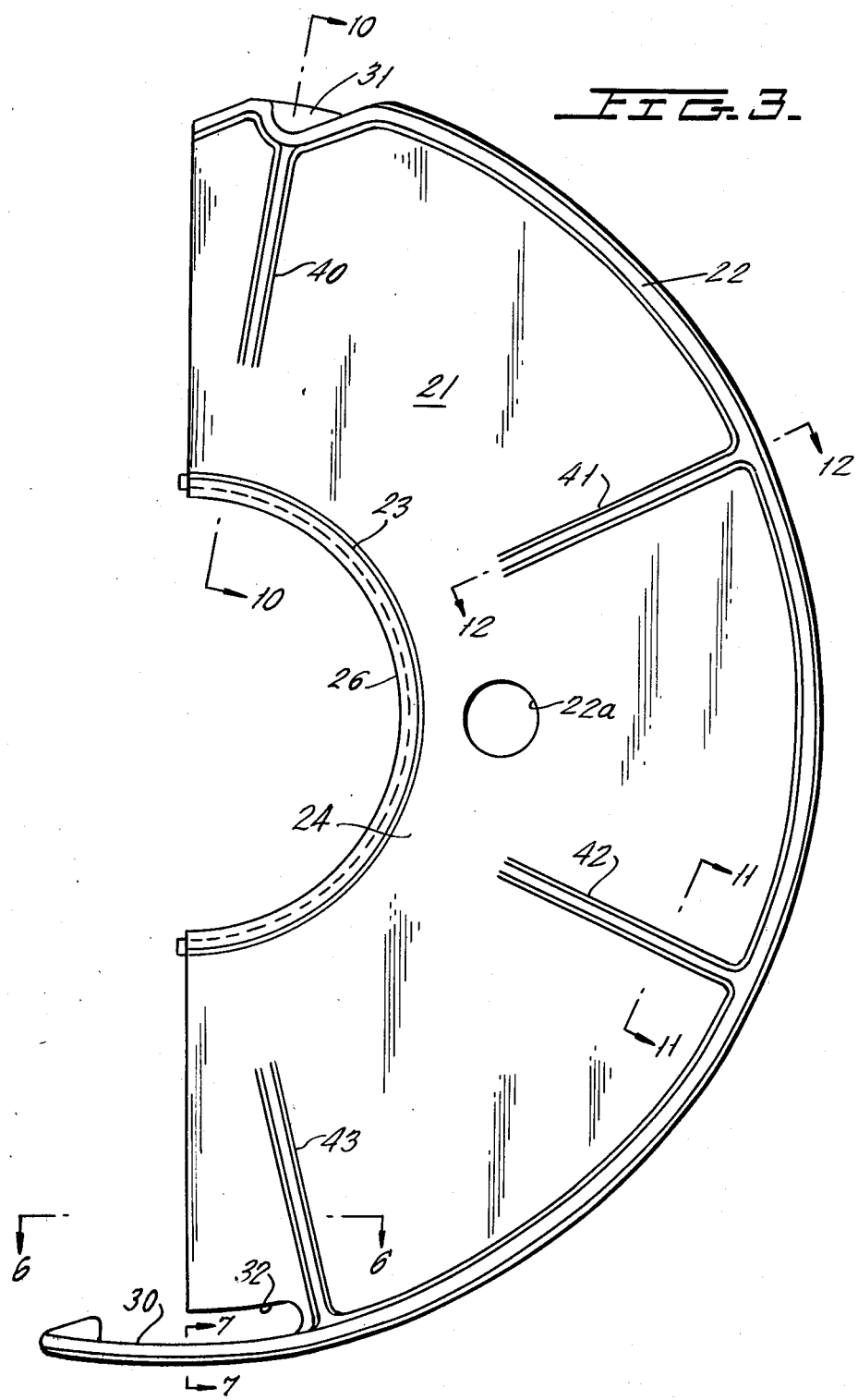

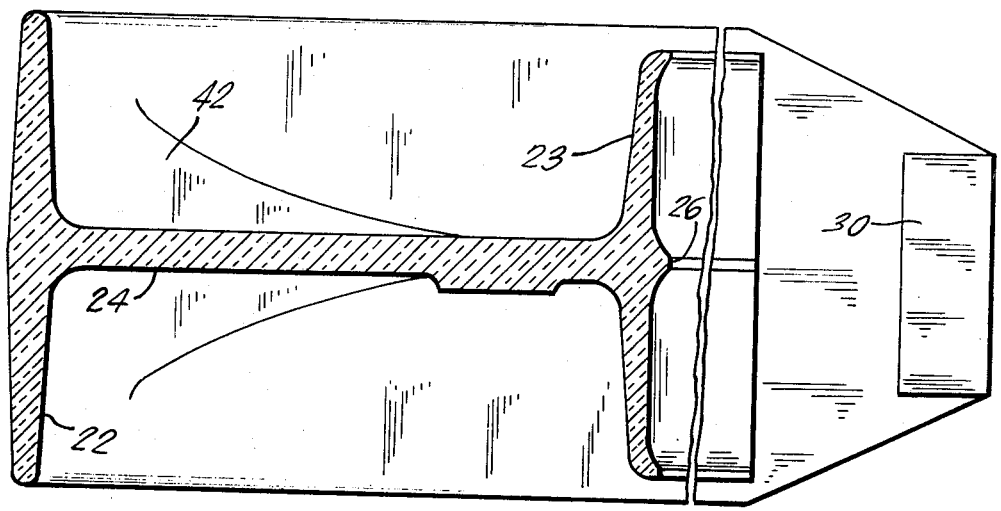
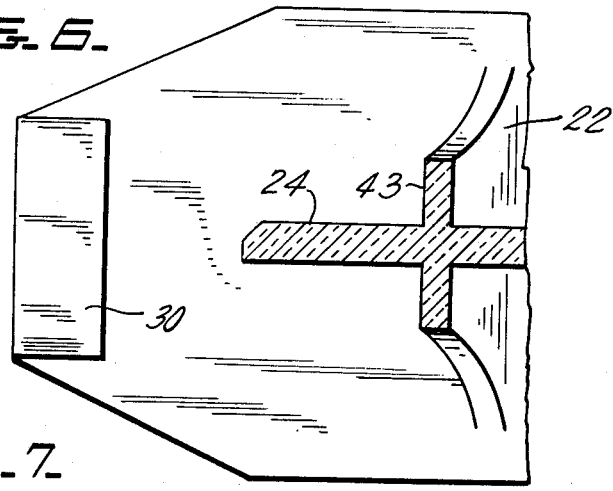
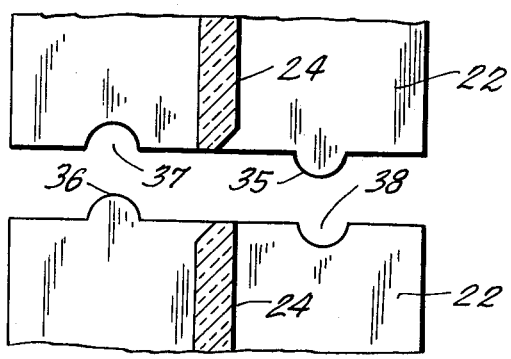

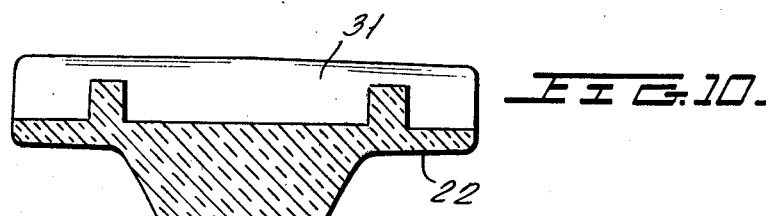
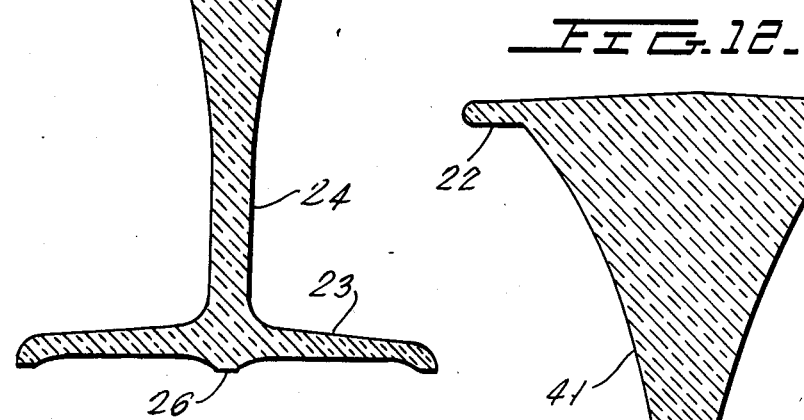
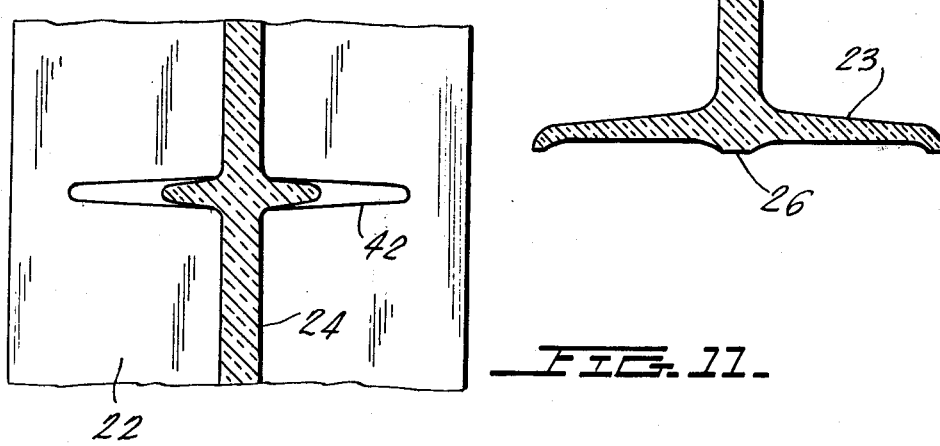

INSULATION SPACER FOR GAS-INSULATED TRANSMISSION LINE WITH IMPROVED OUTER RIM STRUCTURE

BACKGROUND OF THE INVENTION

This invention relates to flexible gas-insulated cables, and more specifically relates to a novel insulator structure for supporting a high voltage conductor within a flexible outer housing which is filled with electronegative gas. Insulators for flexible gas-insulated cable are well known in the art and typically are shown in U.S. Pat. Nos. 4,095,041; 4,100,367 and 4,122,298, each of which is assigned to the assignee of the present invention.

The insulators must be constructed to be able to snap over an elongated conductor which is to be centrally supported within an outer housing. Thus, the insulators are commonly made in sections which can be snapped together over the central conductor and must have sufficient strength to withstand the force of having the outer housing formed over their outer peripheries in a suitable forming and corrugating apparatus which produces the flexible outer housing. Finally, the insulators must be capable of withstanding the substantial loading forces which are produced when the flexible bus is bent on a radius as when the cable is wound on a reel.

It has been found that insulator designs used in the past can fail at their outer rim during the time the outer enclosure is being corrugated and/or during the time the cable is being bent to load it on a circular reel. Also, after the cable is installed, loads caused by the differential expansion of the central conductor and outer enclosure create forces on the insulators. Thus, the central conductor which is confined by the enclosure tends to get hotter during operation than the outer enclosure and, therefore, expands more than the outer shell. This sets up axial forces throughout the cable, and radial forces could occur in the curved rim sections of the insulators.

It has further been found with present designs that when the insulator fails, it commonly fails either at the latch or keeper areas at which two halves or multiple sections of the insulator are joined together.

BRIEF SUMMARY OF THE INVENTION

In accordance with the present invention, a novel insulator structure is provided, formed of two identical halves which have novel rib structures extending from the outer rim and tapering inwardly toward the central web region and terminating approximately two-thirds of the distance from the outer rim toward the central rim of the insulator. Preferably, rib sections are provided at both the latch and keeper areas of each of the halves. By placing the ribs in this manner, the web area of high dielectric stress near the center of the insulator, and close to the central conductor, is kept to a minimum thickness. The ribs themselves provide increased mechanical support, particularly near the latch and in the keeper area, to prevent breakage at these points when the insulators are tested under radial loading.

Insulators using this design for cable rated at 345 kV have tested successfully at 555 kV at 60 Hertz for one minute. This indicates that the placement and shape of the reinforcing ribs does not create destructive dielectric disturbances in the insulator.

BRIEF DESCRIPTION OF THE DRAWINGS

FIG. 2 is a front elevation view of one insulator half constructed in accordance with the present invention.

FIG. 3 is a front elevation view of the second half of the insulator constructed in accordance with the invention.

FIG. 5 is a cross-section view of the insulator half of FIG. 2 taken across the section line 5—5 in FIG. 2.

FIG. 6 is a cross-section view of FIG. 3 taken across the section line 6—6 in FIG. 3.

FIG. 7 is a cross-section view of FIG. 3 taken across the section line 7—7 in FIG. 3.

FIG. 8 is a cross-section view of FIG. 4 taken across the section line 8—8 in FIG. 4.

FIG. 9 is a cross-section view taken across section line 9—9 in FIG. 4.

FIG. 10 is a cross-section view taken across the section line 10—10 in FIG. 3.

FIG. 11 is a cross-section view taken across section line 11—11 in FIG. 3.

FIG. 12 is a cross-section view of FIG. 3 taken across the section line 12—12 in FIG. 3.

DETAILED DESCRIPTION OF THE DRAWINGS

Figure 1:
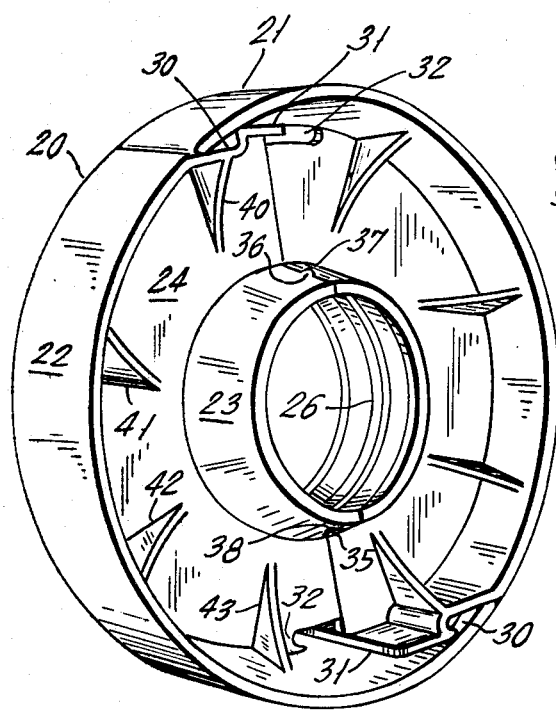
FIG. 1 is a perspective view of two halves of an insulator constructed in accordance with the present invention, with the halves connected to one another at their respective latch and keeper areas.

Referring now to the drawings, the single insulator structure shown therein is one of a plurality of identical insulators which would be used in an elongated flexible gas-insulated cable of well known type. The insulator is shown in the figures as made of two halves which are latched together, as will be later described, and may be made of any suitable plastic material by an injection molding process. The insulator is preferably used in a flexible gas-insulated cable for a high voltage transmission system having a relatively low frequency, for example, 60 Hertz, at high voltage, for example, 345,000 volts. The central conductor of the cable is supported by the insulator within an outer corrugated housing, with both the central conductor and outer corrugated housing being flexible. The housing is filled with an electronegative gas, such as $SF_6$ at a positive pressure, for example, two to three atmospheres. The insulator outer diameter typically may be 336 millimeters and may support a central bus having an outer diameter which typically may be about 120 millimeters. The novel insulator of the invention, to be described hereinafter, permits the bending of the entire cable to a radius having a ratio of reel diameter to cable diameter of about 9 to 1. Thus the cable can be wound to a smaller diameter than in the past, thus permitting the use of a smaller shipping reel for shipping the cable.

The insulator structure generally consists of the two halves 20 and 21. Note that half 21 may have an opening 22a therein to permit passage of gas through the interior of the housing of the completed cable. Halves 20 and 21 are otherwise identical and the same identifying numerals used hereinafter will identify similar parts.

Each of the halves is molded from a suitable plastic as a unitary part. They each consist of an outer rim 22, an inner rim 23 and a central connecting web 24. As shown in FIG. 7, the outer rim 22 has a generally symmetrically tapered configuration. As shown, for example, in FIGS. 4 and 5, the inner rim 23 is also shaped for maximum dielectric efficiency and contains a central projection 26 which is shaped to enter the cooperating corrugation of the central conductor to be supported by the insulator.

The central web 24 is preferably as thin as possible to present as small as possible a cross-section to the high electric field which will exist between a conductor on the interior of the rim 23 and the grounded conductive housing surrounding the exterior of rim 22.

In order to join together the two halves 20 and 21 of FIGS. 2 and 3, as shown in FIG. 1, each of the halves is provided with integral cooperating latch members shown as the projecting latch 30 and a respective latch keeper region 31. During assembly, the latch 30 of one half will snap into the latch keeper 31 of the other half as is well known, and as will be apparent in the drawings. Note that the latch member 30 is made relatively flexible by cutting a notch 32 into the web 24 adjacent the latch 30. The keeper 31, however, is rigid.

Figure 4:
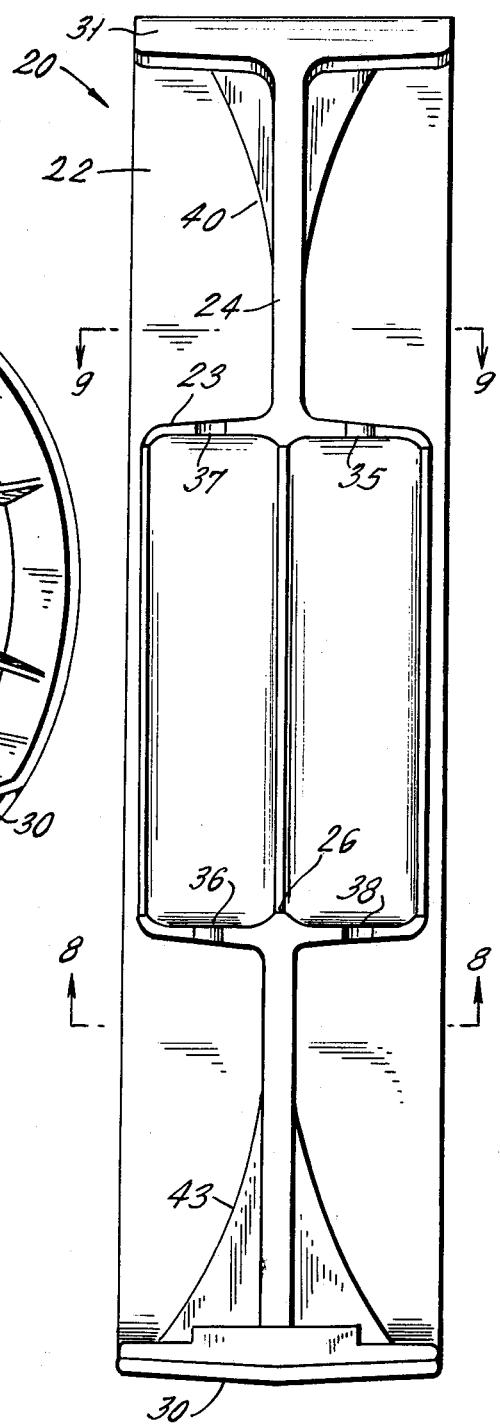
FIG. 4 is an elevation view of the diametrical edge of the insulation half of FIG. 2.

Each of the halves 20 and 21 is further provided with keying projections and notches which cooperate with one another to hold the halves in the same axial position relative to one another after they are assembled. Thus, the half 20 of FIG. 2 is provided with key projections 35 and 36 (FIGS. 4, 8 and 9) and key depressions 37 and 38 (FIGS. 4, 8 and 9). The key projections and key depressions 35 through 38 of adjacent insulator halves are automatically aligned with one another during the assembly of the two halves.

In accordance with the present invention, novel reinforcing ribs are provided extending from the outer rim and tapering into the central web.

FIGS. 2 and 3 show four ribs 40 to 43 for each insulator half. Each of the ribs 40 to 43 is identically shaped as shown variously in FIG. 5 (rib 42), FIG. 6 (rib 43), FIG. 10 (rib 40), FIG. 11 (rib 42) and FIG. 12 (rib 41). The ribs taper outwardly from the central web beginning at a point about one-third of the radial distance along the web from the central rim 23 and the ribs then taper or flare outwardly to join the outer rim 22. The outward flare is a relatively gentle flare and, for example, is on a radius of about 113 millimeters.

Two of the novel reinforcing ribs of the invention, ribs 40 and 43, are preferably located immediately adjacent the keeper 31 and just behind the latch 30, respectively. It has been found that this placement of the ribs prevents breakage at these points which is the most frequent point of failure in insulators of the type to which the invention applies.

By causing the ribs to taper over a distance of about two-thirds of the radial dimension of the web 24 and by causing them to begin to taper outwardly only one-third of the radial dimension of the web away from the central conductor, the high dielectric stress adjacent to the central conductor is on regions of the web 24 which have minimum thickness. Thus, the provision of the reinforcing ribs 40 through 43 does not cause undue dielectric stress within the insulator. The placement of the ribs in the latch and keeper areas 30 and 31, respectively, as pointed out previously, eliminates breakage at these points when insulators are tested for failure under radial loading.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A support insulator for a flexible gas-insulated cable; said support insulator comprising a molded plastic disk-shaped member having a cylindrical outer rim and a concentric cylindrical inner rim joined together by a relatively thin flat web; said outer rim being adapted to receive an outer flexible conductive housing; said inner rim being adapted to receive a conductor which is to be supported coaxially within said outer flexible housing; and a plurality of circumferentially spaced tapered reinforcing ribs disposed perpendicularly to said central web and extending symmetrically about either side of said central web; each of said reinforcing ribs tapering from said central web beginning at a radial distance from said inner rim which is about one-third of the distance between said inner and outer rims; and reinforcing ribs tapering gradually continuously outward to a dimension just less than the length of said cylindrical outer rim at the point where they join the interior surface of said outer rim.

2. The support insulator of claim 1 wherein said insulator consists of two identical halves which are joined together along a diametrical surface through the center of said insulator.

3. The support insulator of claim 2 wherein each of said identical halves includes a latch projection section and a latch keeper section respectively disposed at opposed ends of their outer rim sections; said latch projection section of one half being engageable with said latch keeper section of the other half, whereby said identical halves can be latched together and around a central conductor to be supported by said insulator.

4. The support insulator of claim 3 wherein first and second reinforcing ribs of said plurality of reinforcing ribs are secured to said outer rim of each of said halves immediately adjacent said latch projection section and said latch keeper section respectively.

5. The support insulator of claim 2, 3 or 4 wherein each of said halves is an integrally molded structure.

6. The support insulator of claim 4 wherein said latch projection section includes a flexible portion of said outer rim defined by a slot in said central web; said reinforcing rib secured adjacent to said latch projection section being joined to said outer rim immediately adjacent the end of said slot.

7. The support insulator of claim 6 wherein each of said halves is an integrally molded structure.

8. The support insulator of claim 1, wherein each of said ribs tapers in a continuously curved manner.

* * * * *